US007420802B2

(12) United States Patent
Sone

(10) Patent No.: US 7,420,802 B2
(45) Date of Patent: Sep. 2, 2008

(54) DISK ARRAY DEVICE

(75) Inventor: Masahiro Sone, Numadu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/865,946

(22) Filed: Oct. 2, 2007

(65) Prior Publication Data

US 2008/0031074 A1 Feb. 7, 2008

Related U.S. Application Data

(63) Continuation of application No. 11/529,327, filed on Sep. 29, 2006, now Pat. No. 7,280,354, which is a continuation of application No. 10/891,075, filed on Jul. 15, 2004, now Pat. No. 7,133,282.

(30) Foreign Application Priority Data

May 19, 2004 (JP) ............................ 2004-149413

(51) Int. Cl.
*G06F 1/16* (2006.01)
*H05K 7/00* (2006.01)

(52) U.S. Cl. .......................... 361/685; 320/107; 710/8; 713/300; 365/145

(58) Field of Classification Search ................... 701/35, 701/207; 320/118, 128; 713/300; 365/145, 365/222; 710/8; 361/679–687, 724–727
See application file for complete search history.

(56) References Cited

U.S. PATENT DOCUMENTS 5,694,293 A 12/1997 Seto et al.
5,905,632 A 5/1999 Seto et al.
6,446,141 B1 9/2002 Nolan et al.
6,636,016 B2 10/2003 Tanaka et al.
6,977,813 B2 12/2005 Fuseya et al.
6,980,419 B2 12/2005 Smith et al.
7,019,391 B2 3/2006 Tran
7,133,282 B2 11/2006 Sone
2002/0079866 A1 6/2002 Odaohhara
2004/0190210 A1 9/2004 Leete
2005/0120251 A1 6/2005 Fukumori
2005/0243509 A1 11/2005 Fuseya et al.
2006/0245168 A1* 11/2006 Soeda et al. ................ 361/724
2007/0143639 A1* 6/2007 Sakakibara et al. ......... 713/300

* cited by examiner

*Primary Examiner*—Hung V Duong
(74) *Attorney, Agent, or Firm*—Antonelli, Terry, Stout & Kraus, LLP.

(57) ABSTRACT

A disk array device including a logic mounting unit which mounts a cache memory which temporarily stores data transferred from a high-level device and performs control to write the data stored in the cache memory to a plurality of memory devices at the time of power failure. The power supply from the battery mounting unit to the plurality of memory devices is sequentially stopped in an order of memory device to which data writing from the cache memory has been completed at a time of the power failure, and even after the power supply to the hard disks in which the destage has been completed is stopped, the power supply into the cache memory from the battery is continued.

12 Claims, 17 Drawing Sheets

DISK ARRAY DEVICE

CROSS-REFERENCE TO RELATED APPLICATION

This is a continuation of U.S. application Ser. No. 11/529,327, filed Sep. 29, 2006, now U.S. Pat. No. 7,280,354 which is a continuation of U.S. application Ser. No. 10/891,075, filed Jul. 15, 2004 (now U.S. Pat. No. 7,133,282). This application relates to and claims priority from Japanese Patent Application No. 2004-149413, filed on May 19, 2004. The entirety of the contents and subject matter of all of the above is incorporated herein by reference.

BACKGROUND OF THE INVENTION

The present invention relates to a disk array device and more specifically to a technique effectively applied to data backup by a battery at the time of a power failure.

A conventional disk array device, when power supply interruption such as a power failure occurs, retains data in a volatile memory such as a cache memory by a backup battery.

SUMMARY OF THE INVENTION

However, if the time of power supply interruption exceeds the capacity of a battery, there are risks such as data loss. To avoid these risks, electric power supplied from the battery may be used to write volatile data such as a cache into a nonvolatile memory area (hereinafter "destage"). However, in the case of a so-called short power failure occurring by several tens of seconds, once a process to write data on a cache into a HDD is carried out, part of data is retreated from the cache even if electric power is thereafter recovered. Therefore, response speed becomes slow accordingly.

A first object of the present invention is to control a data retaining operation of a storage device in an optimized manner depending on the conditions of the power supply interruption. Further, it is to provide such a backup power source that the control of respective portions of a memory device is maintained as normally at the time of the power failure within a predetermined time. By the way, since a process to write data on the cache into a HDD requires large consumption of electric power, it is necessary to employ an external UPS (Uninterruptible Power Supply) or the like. Therefore, restriction to securement and the like of its installation space is unavoidable.

A second object of the present invention is to incorporate a backup power system into a case body of a storage device, without employing such an external UPS.

Another object of the present invention is to enhance instantaneous power failure durability to a backup power source in order to maintain operations of the entire device, even in the above-mentioned instantaneous power failure.

Still another object of the present invention is to provide such a storage device that a backup power source can be maintained in an optimized manner even in a storage case body having many parts to become heat sources, such as a processor on a control board.

Outlines of representative ones of the inventions disclosed in the present application will be briefly described as follows.

A disk array device according to the present invention, which has a logic mounting unit and a memory device mounting packaging unit, comprises: a fan for cooling each of said logic mounting unit and said memory device mounting unit; and a case body accommodating each of said logic mounting unit and said memory device mounting unit, wherein said logic mounting unit mounts: a channel controlling unit to which a higher-level device is connected and that performs data transfer control; a disk controlling unit to which a memory device is connected and that performs data transfer control; a cache memory into which data to be transferred between said higher-level device and said memory device is stored temporarily; a shared memory into which control information communicated by said channel controlling unit and said disk controlling unit is stored; and a connecting unit to which said channel controlling unit, said disk controlling unit, said cache memory, and said shared memory are connected, and wherein said memory device mounting unit mounts a plurality of said memory devices, and wherein a battery mounting unit that mounts a nickel hydrogen battery for supplying a backup power source at the time of a power failure is disposed at a lower portion of said case body, and wherein said nickel hydrogen battery in said battery mounting unit disposed at the lower portion of said case body is cooled by natural conviction of air inside said case body by said fan.

Also, a disk array device according to the present invention, which includes a storage controlling unit with a logic mounting unit and a storage driving unit with a memory device mounting unit, comprises: a fan for cooling each of said logic mounting unit and said memory device mounting unit; and a case body for accommodating said storage controlling unit and a case body accommodating said storage driving unit, wherein said logic mounting unit mounts: a channel controlling unit to which a higher-level device is connected and that performs data transfer control; a disk controlling unit to which a memory device is connected and that performs data transfer control; a cache memory into which data to be transferred between said higher-level device and said memory device is stored temporarily; a shared memory into which control information communicated by said channel controlling unit and said disk controlling unit is stored; and a connecting unit to which said channel controlling unit, said disk controlling unit, said cache memory, and said shared memory are connected, and wherein said memory device mounting unit mounts a plurality of said memory devices, and wherein a battery mounting unit that mounts a nickel hydrogen battery for supplying a backup power source at the time of a power failure is disposed at each lower portion of the case body of said storage controlling unit and the case body of said storage driving unit, and wherein said nickel hydrogen battery in said battery mounting unit, which is disposed at each lower portion of the case body of said storage controlling unit and the case body of said storage driving unit, is cooled by natural conviction of air created inside the case body of said storage controlling unit and the case body of said storage driving unit by said fan.

DESCRIPTION OF THE PREFERRED EMBODIMENTS

Hereinafter, embodiments of the present invention will be detailed based on the drawings. Note that the same members are denoted by the same reference symbol in principle throughout all the drawings for explaining the embodiments and the repetitive descriptions thereof will be omitted.

<Example of External Structure of Disk Array Device>

Figure 1:
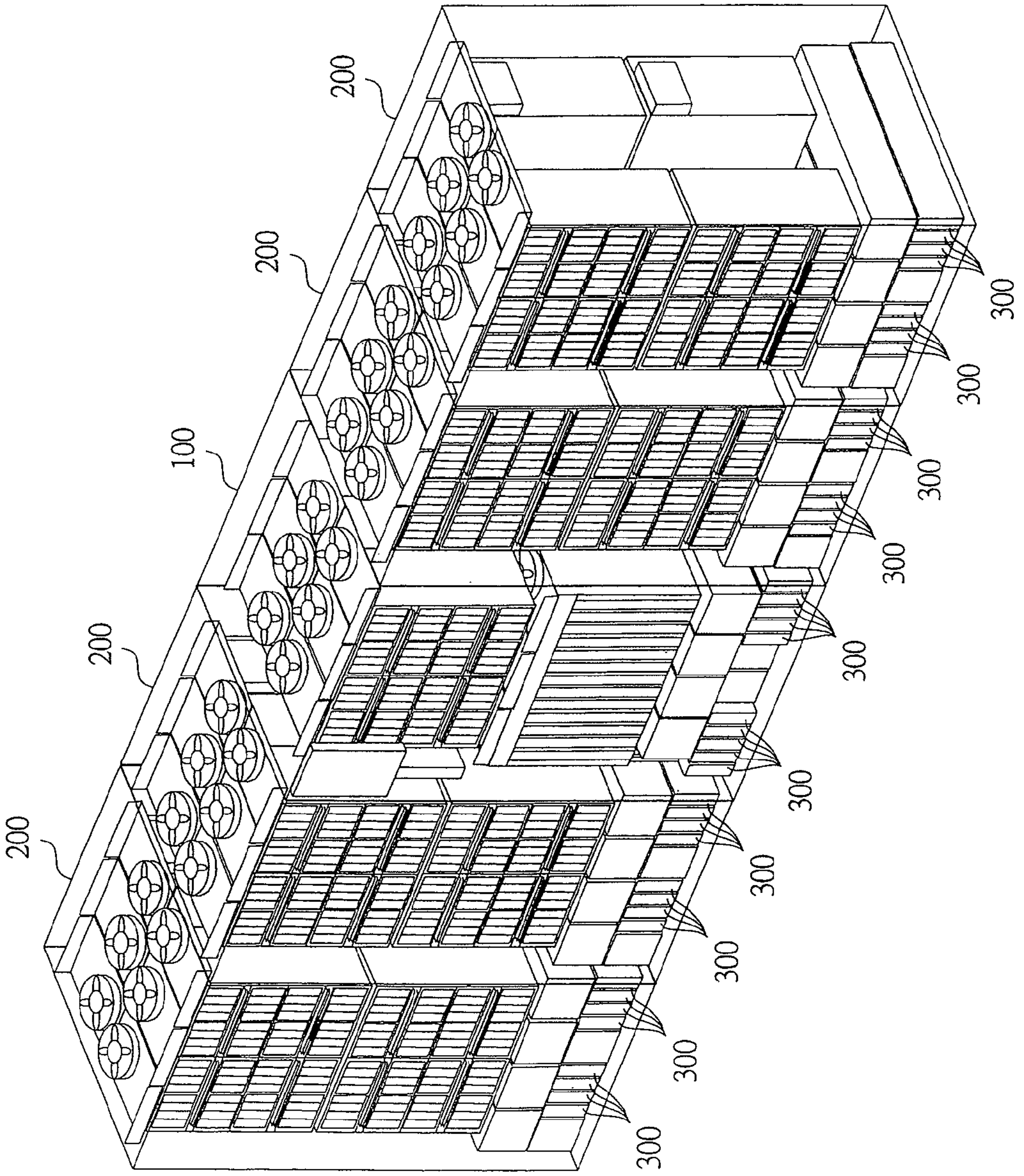
FIG. 1 is a schematic diagram showing an example of an external structure of a disk array device according to an embodiment of the present invention.
Figure 2A:
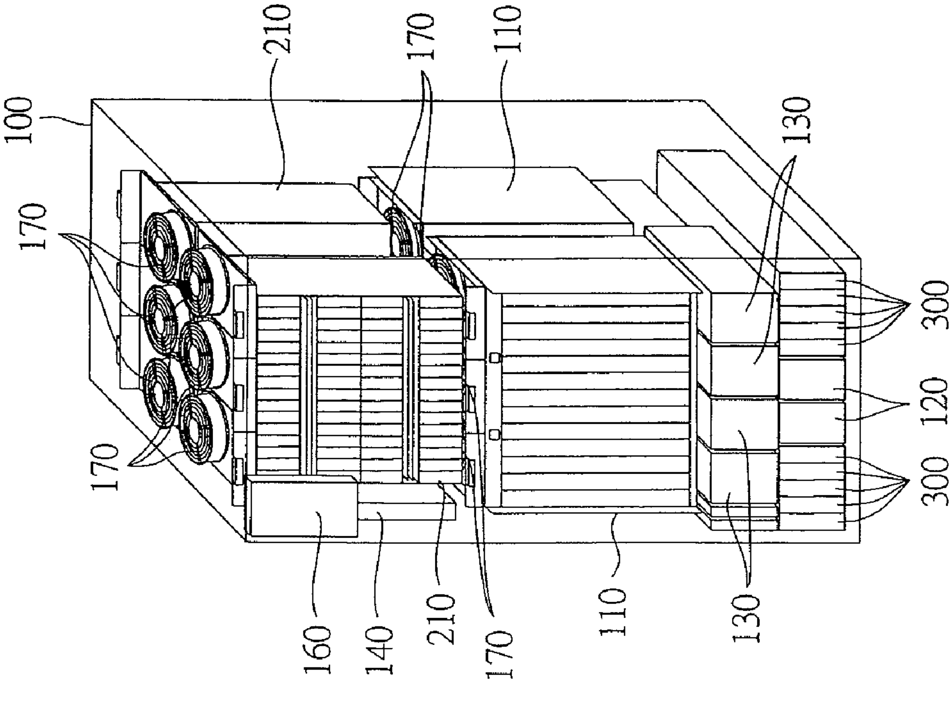
FIG. 2A is a schematic diagram showing an example of an external structure of a storage controlling unit in a disk array device according to an embodiment of the present invention.
Figure 2B:
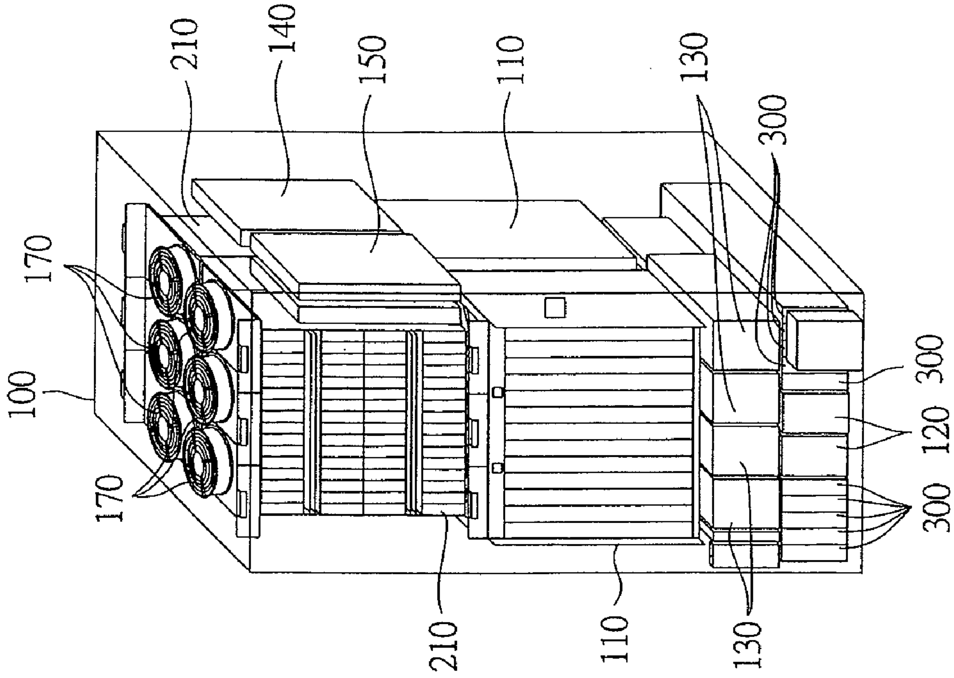
FIG. 2B is a schematic diagram showing an example of an external structure of a storage controlling unit in a disk array device according to an embodiment of the present invention.
Figure 3A:
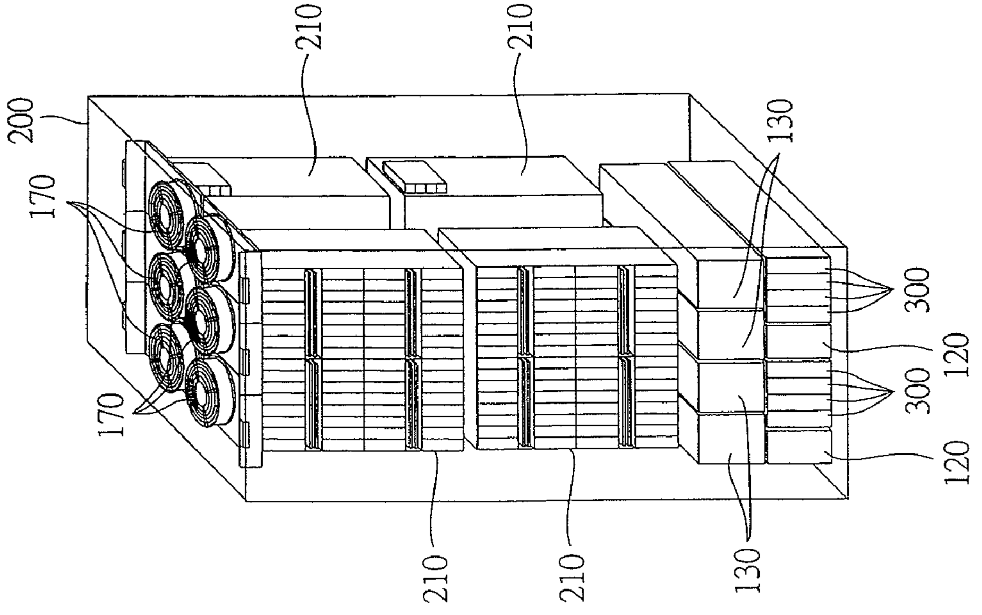
FIG. 3A is a schematic diagram showing an example of an external structure of a storage driving unit in a disk array device according to an embodiment of the present invention.
Figure 3B:
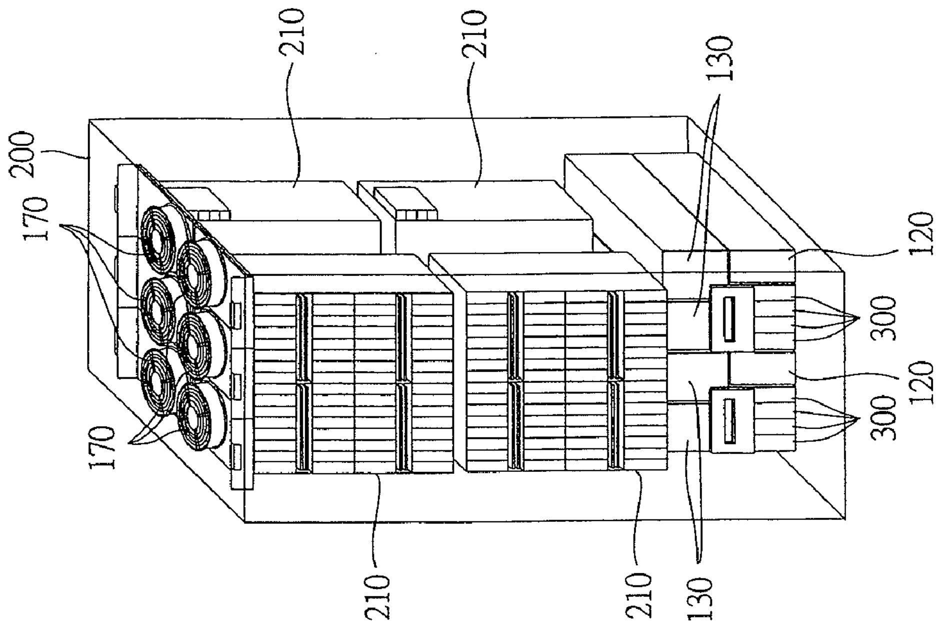
FIG. 3B is a schematic diagram showing an example of an external structure of a storage driving unit in a disk array device according to an embodiment of the present invention.
Figure 4B:
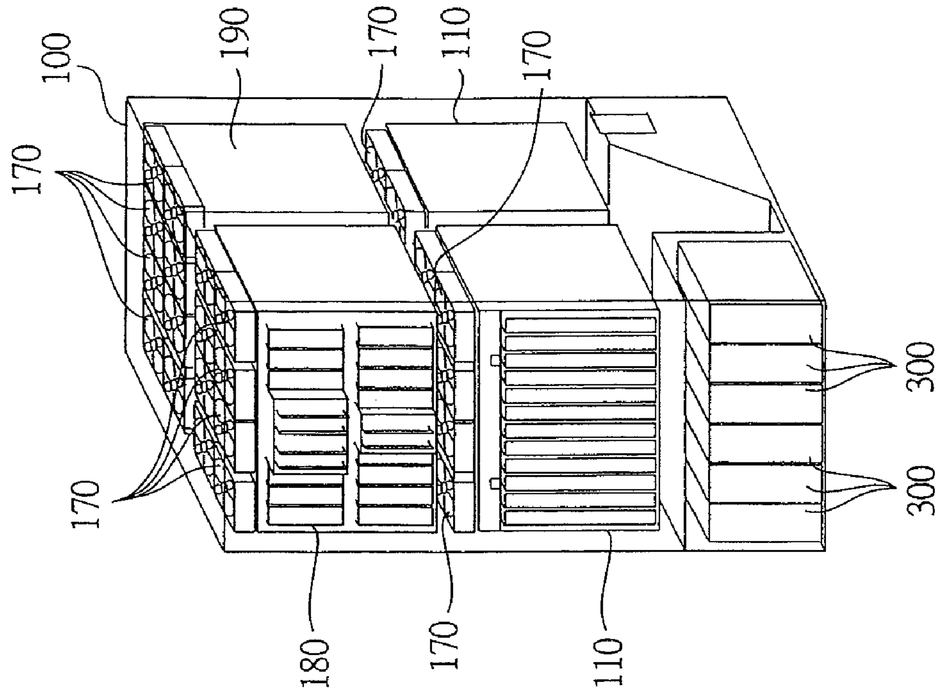
FIG. 4B is a schematic diagram showing another example of an external structure of the storage controlling unit in the disk array device according to another embodiment of the present invention.
Figure 4A:
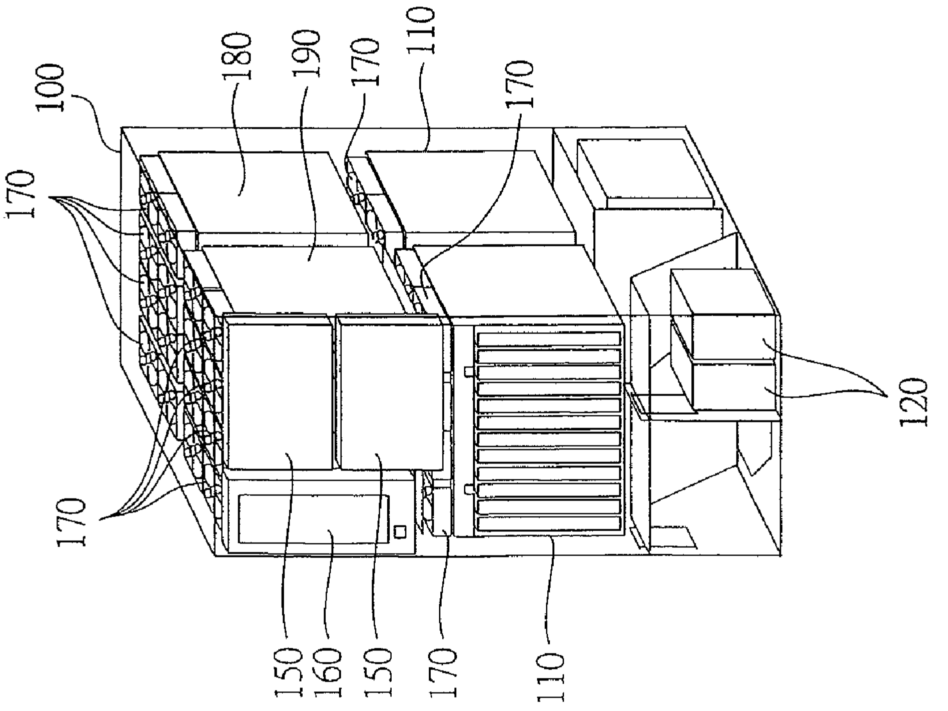
FIG. 4A is a schematic diagram showing another example of an external structure of the storage controlling unit in the disk array device according to another embodiment of the present invention.

In reference to FIGS. 1 to 4, an example of an external structure of a disk array device according to an embodiment of the present invention will be described below. FIG. 1 is a diagram showing an example of an external structure of the disk array device according to the embodiment of the present invention. FIGS. 2A and 2B are diagrams showing an example of an external structure of a storage controlling unit, wherein FIG. 2A is a drawing viewed from a front direction and FIG. 2B is a drawing viewed from a rear direction. FIGS. 3A and 3B are diagrams showing an example of an external structure of a storage driving unit, wherein FIG. 3A is a drawing viewed from a front direction and FIG. 3B is a drawing viewed from a rear direction. FIGS. 4A and 4B are diagrams showing another example of the external structure of the storage controlling unit, wherein FIG. 4A is a drawing viewed from a front direction and FIG. 4B is a drawing viewed from a rear direction.

As shown in FIG. 1, a disk array device according to this embodiment has a structure in which a storage controlling unit 100 and storage driving units 200 are housed in respective case bodies. In the example shown in FIG. 1, at both sides of a case body for the storage controlling unit 100, case bodies for the storage driving units 200 are arranged. Further, at lower portions of the respective case bodies of the storage controlling unit 100 and the storage driving units 200, battery boxes (battery packaging units) 300, each of which accommodates a nickel hydrogen battery and a charging circuit thereof, etc. for backup at the time of a power failure, are arranged.

As shown in FIGS. 2A and 2B, the storage controlling unit 100 has a structure in which there are mounted respective logic boards comprising: a channel controlling unit to which a higher-level device is connected and that performs a data transfer control; a disk controlling unit to which a memory device is connected and that performs a data transfer control; a cache memory into which data to be transferred between the higher-level device and the memory device is stored temporarily; a shared memory into which control information communicated by the channel controlling unit and the disk controlling unit is stored; and a switch (connecting unit) to which the channel controlling unit, the disk controlling unit, the cache memory, and the shared memory are connected. In the structure, there are provided with: logic boxes (logic mounting units) 110 performing a data transfer process etc. in the storage controlling unit 100; AC power sources 120 inputting and distributing an AC power source; ACDC power sources 130 outputting a DC power source; a console PC 140 and a service processor 150 that control a storage device; a display panel 160; and battery boxes 300.

In the logic box 110, a plurality of slots are provided. Into each slot, there are inserted boards equipped with logic boards respectively constituting: the channel controlling unit; the disk controlling unit; the cache memory; the shared memory; and the switch, wherein the respective boards and connectors on a side of the logic box 110 are electrically connected so that various signals are sent and received and power supply is obtained.

Additionally, in the example shown in FIGS. 2A and 2B, an interior of the storage controlling unit 100 is provided with hard disk boxes (memory device mounting units) 210 in which a plurality of memory devices such as hard disks are accommodated, whereby a minimum unit of a disk array device is configured by the case body of the storage controlling unit 100.

Further, on top surfaces of the logic boxes 110 and the hard disk boxes 210, fans 170 are arranged for dissipating heat generated by the channel controlling unit, the disk controlling unit, the cash memory, the shared memory, the switch, and the hard disks, etc. Additionally, in the ACDC power sources 130, fans 170 are arranged for dissipating heat generated from circuits in the ACDC power sources 130.

The storage driving unit 200 is, as shown in FIG. 3, provided with a structure of AC power sources 120, ACDC power sources 130, hard disk boxes 210, and battery boxes 300.

In addition, on a top surface of the hard disk box 210 disposed at the top stage, fans 170 are arranged for dissipating heat generated from the hard disks etc. Also in the ACDC power sources 130, fans 170 are arranged for dissipating heat generated from circuits in the ACDC power sources 130.

The storage controlling unit 100 is, as shown in FIG. 4, provided with another structure comprising: logic boxes 110; AC power sources 120; a service processor 150; a display panel 160; a power source box 180 on which ACDC power sources are mounted; a monitoring box 190 on which boards monitoring the device environment of the disk array device are mounted; and battery boxes 300.

In addition, on top surfaces of the logic boxes 110, the power source box 180, and the monitoring box 190, fans 170 are provided for dissipating heat generated from the channel controlling unit, the disk controlling unit, the cache memory, the shared memory, the switch, the hard disks, respective boards, and the ACDC power sources, etc.

As shown in FIGS. 1 to 4, the battery boxes 300 are arranged at the lower portions of the respective case bodies of the storage controlling unit 100 and the storage driving unit 200, thereby being mounted onto the storage controlling unit 100 and the storage driving unit 200. However, by using a nickel hydrogen battery as a battery inside the battery box 300, it is possible to employ a battery having small size and large capacity.

Accordingly, even in a structure where the battery boxes 300 are mounted on the storage controlling unit 100 and the storage driving unit 200, the use of the battery boxes 300 mounted on the storage controlling unit 100 and the storage driving unit 200 makes it possible to carry out a process to destage data on the cache memory and the shared memory mounted in the logic boxes 110, to hard disks etc. in the hard disk boxes 210, at the time of a power failure.

<Cooling Operation in Case Body>

Figure 5:
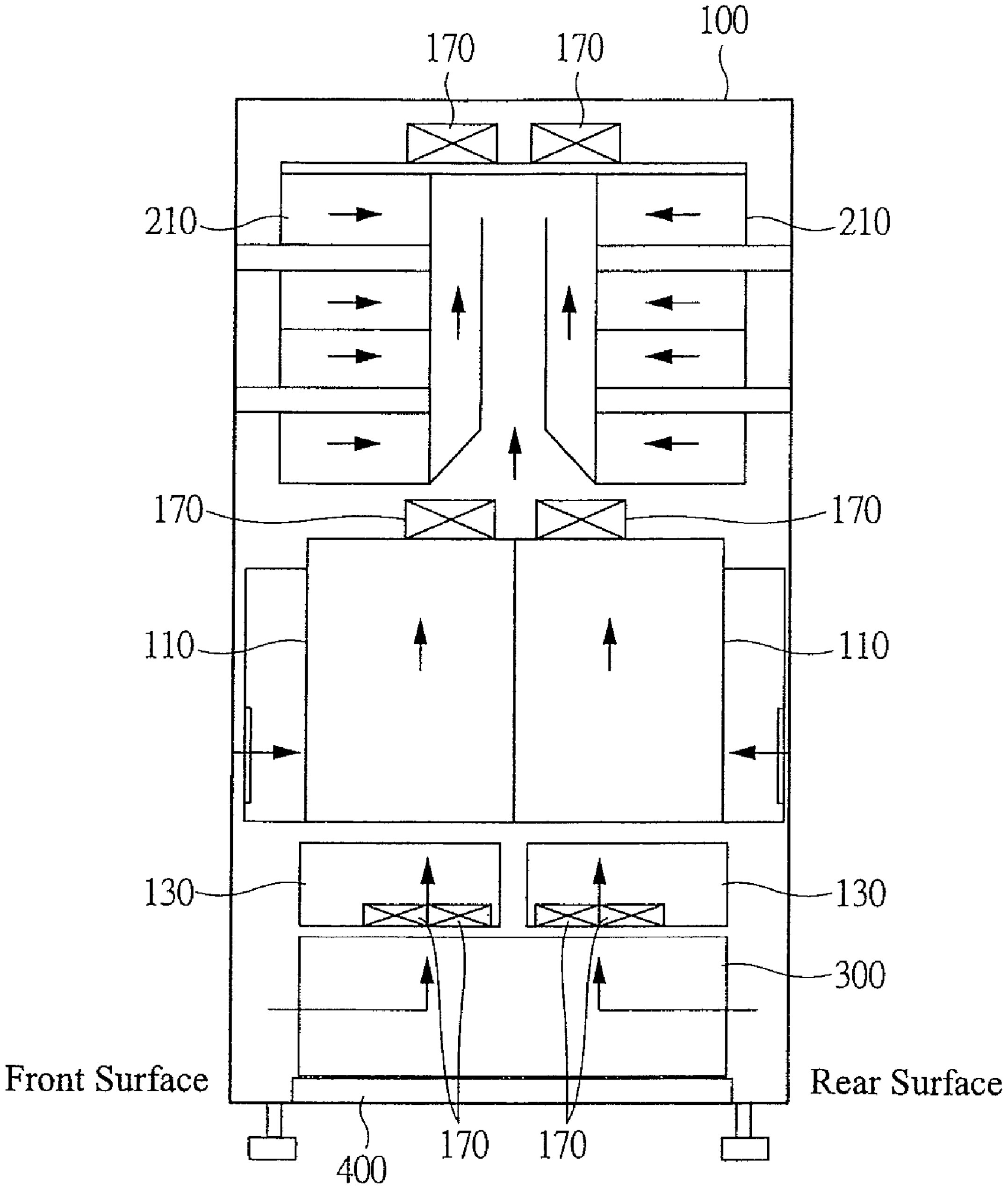
FIG. 5 is an explanatory diagram for explaining a cooling operation of the case body in the storage controlling unit shown in FIG. 2.
Figure 6:
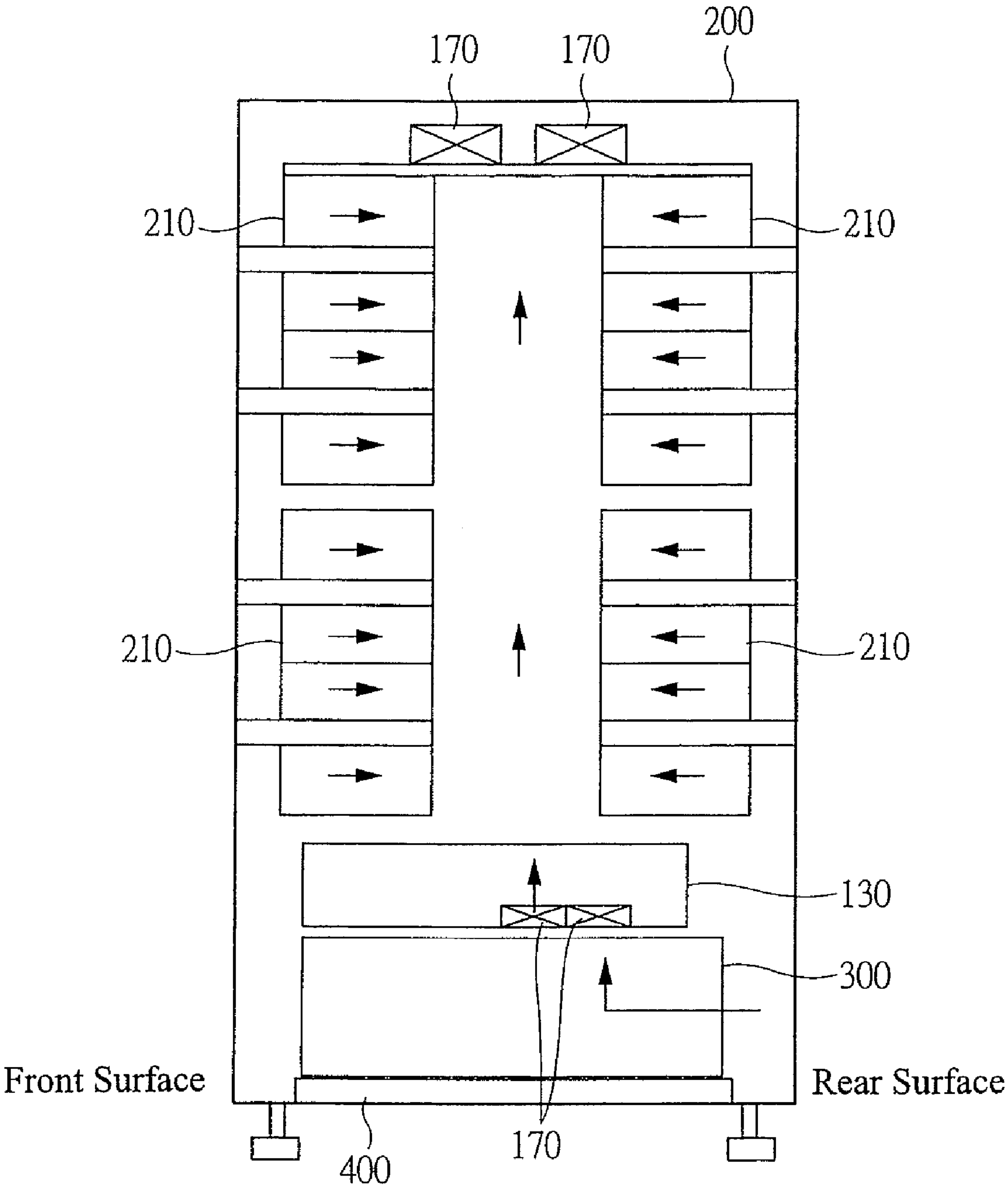
FIG. 6 is a explanatory diagram for explaining a cooling operation of the case body of the storage driving unit shown in FIG. 3.
Figure 7:
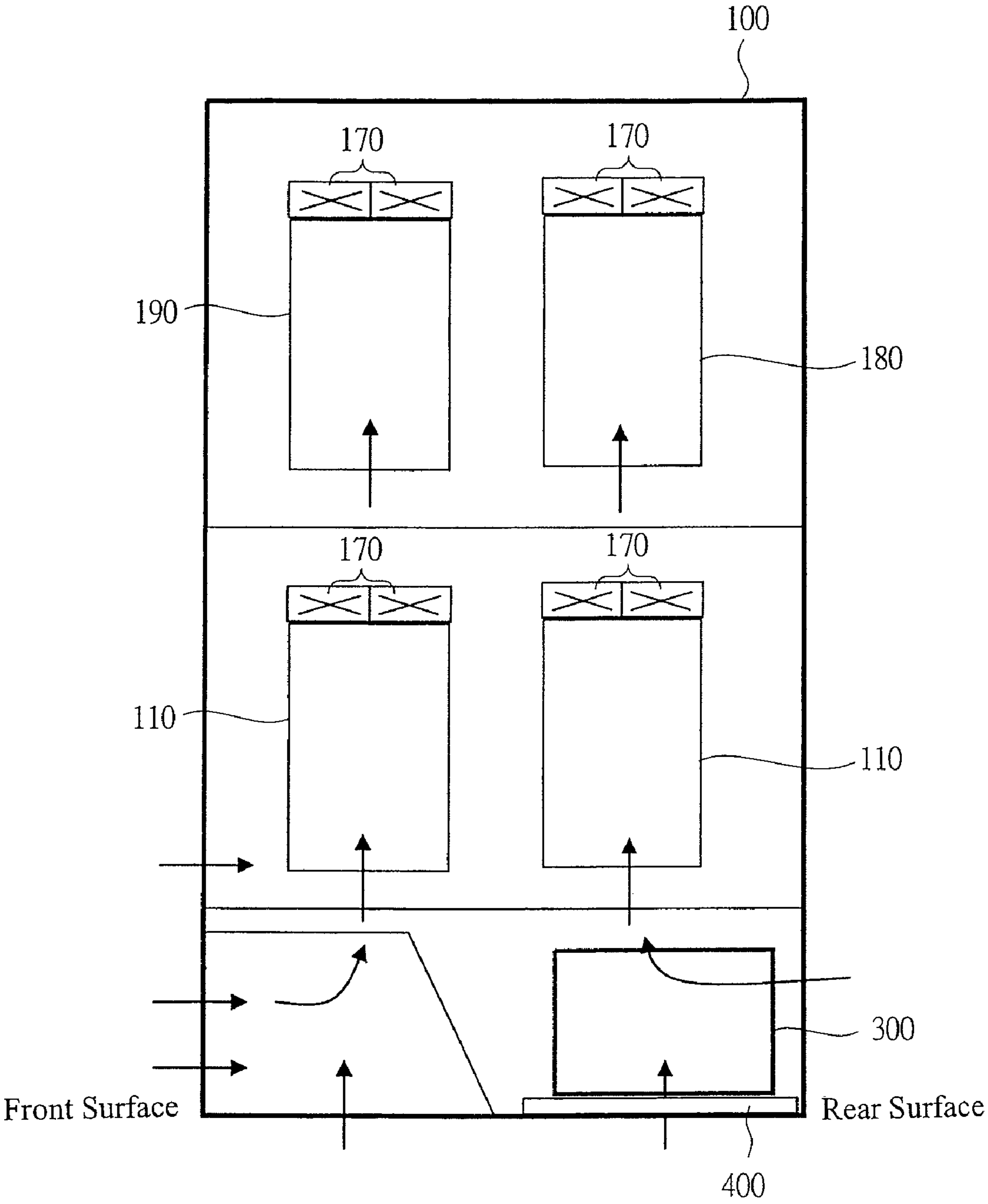
FIG. 7 is a schematic diagram for explaining cooling actions in the case body of the storage controlling unit shown in FIG. 4.

In reference to FIGS. 5 to 7, a cooling operation in each case body of the disk array device will be explained below. FIG. 5 is an explanatory diagram for explaining a cooling operation of the case body in the storage controlling unit shown in FIG. 2; FIG. 6 is an explanatory diagram for explaining a cooling operation of each case body in the storage driving unit shown in FIG. 3; and FIG. 7 is an explanatory diagram for explaining a cooling operation of each case body in the storage controlling unit shown in FIG. 4.

In this embodiment, there is dissipated heat generated from the fans 170, which are provided on the top surfaces of the logic boxes 110, the hard disk boxes 210, the power source box 180, and the monitoring box 190 and provided inside the ACDC power source 130. Therefore, wind (air) paths are formed in the case body of the storage controlling unit 100 and in the case body of the storage driving unit 200, and the cooling of the battery boxes 300 is performed using natural convection generated by these wind paths in the case body.

In the storage controlling unit 100 shown in FIG. 2, as shown in FIG. 5, by the fans 170 provided on the respective top surfaces of the logic boxes 110 and the hard disk boxes 210 and the fans 170 provided inside the ACDC power sources 130, wind paths as indicated by arrow marks in FIG. 5 are formed. By natural conviction generated by these wind paths, the battery boxes 300 disposed at the lower portion of the case body are cooled down.

Also, in the storage driving unit 200 shown in FIG. 3, as shown in FIG. 6, by the fans 170 provided on the top surfaces of the hard disk boxes 210 disposed at the top stage and the fans 170 provided inside the ACDC power source 130, wind paths as indicated by arrow marks in FIG. 6 are formed. By natural conviction generated by these wind paths, the battery box 300 disposed at the lower portion of the case body is cooled down.

Further, in the storage controlling unit 100 shown in FIG. 4, as shown in FIG. 7, by the fans 170 provided on the respective top surfaces of the logic boxes 110, the power source box 180, and the monitoring box 190, wind paths as indicated by arrow marks in FIG. 7 are formed. By natural conviction generated by these wind paths, the battery box 300 disposed at the lower portion of the case body is cooled down. Additionally, in the examples as shown in FIGS. 2, 3, and 4, slits are made in a base seat 400 of the battery box 300 to prevent heat from remaining therein.

As described above, cooling of the battery boxes 300 arranged at the lower portions of the case body of the storage controlling unit 100 and the case body of the storage driving unit 200 are carried out using natural conviction generated by the wind paths in the case bodies. Therefore, it is possible to carry out cooling operations in a range of 15° C. to 25° C., which is ideal temperature for battery life of nickel hydrogen batteries, without cooling in excess or warming in excess the nickel hydrogen battery in the battery box 300.

Accordingly, in the case where the nickel hydrogen battery is used as a battery for backup at the time of a power failure, it is possible to expand the battery life to maximum and to secure a guarantee period of a battery as a disk array device.

<Circuit Structure of Battery Box>

Figure 8:
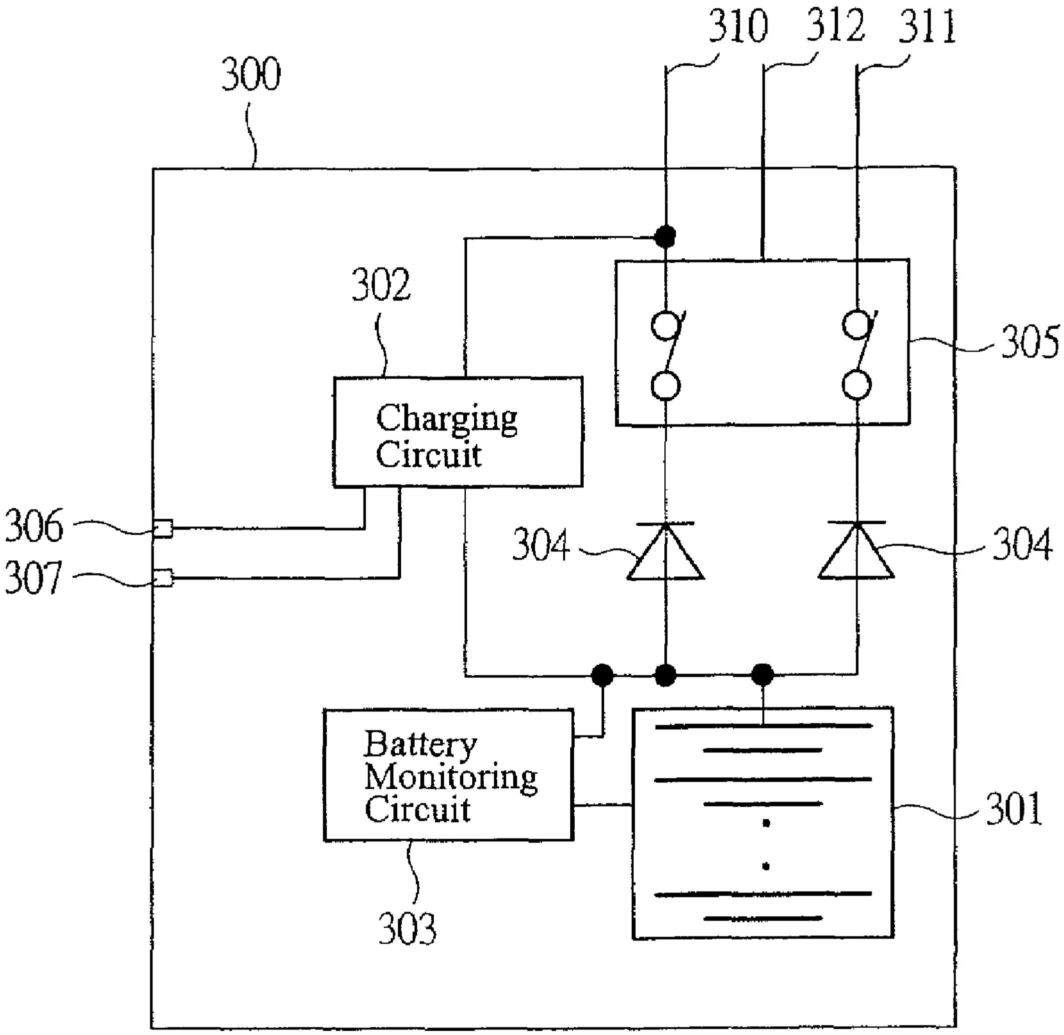
FIG. 8 is a schematic diagram showing an example of a circuit structure of a battery box in a disk array device according to an embodiment of the present invention.
Figure 9:
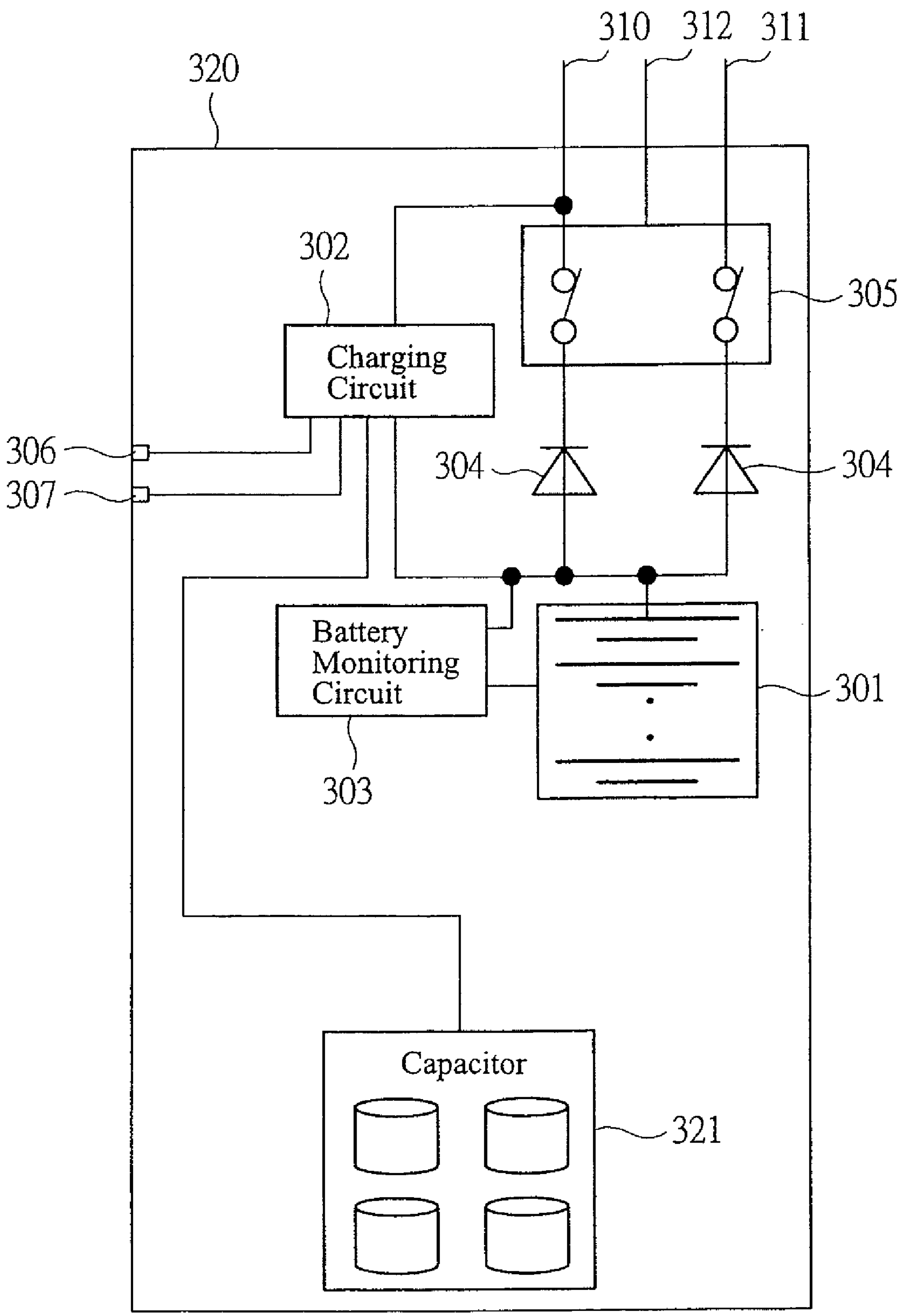
FIG. 9 is a schematic diagram showing an example of the circuit structure of a battery box combined with a capacitor in a disk array device according to an embodiment of the present invention.

In reference to FIGS. 8 and 9, the structure of the battery box will be explained below. FIG. 8 is a diagram showing an example of a circuit structure of a battery box in a disk array device according to an embodiment of the present invention, and FIG. 9 is a diagram showing an example of a circuit structure of a battery box combined with capacitors in a disk array device (hereinafter “capacitor box”) according to an embodiment of the present invention.

In FIG. 8, the battery box 300 comprises a nickel hydrogen battery 301, a charging circuit 302, a battery monitoring circuit 303, a reverse flow preventing diode 304, a switch 305, a system READY lamp 306, and a battery charge lamp 307.

Also, a DC power supply path 310 to be connected to the ACDC power source and the channel controlling unit and the disk controlling unit, etc., and a memory power supply path 311 to be connected to the cache memory and the shared memory, and a battery box controlling bus 312 for controlling the battery box 300 by microprocessors etc. of the channel controlling unit and the disk controlling unit, are connected to the switch 305.

By the DC power supply path 310, DC power for charging the nickel hydrogen battery 301 is inputted, and the DC power is supplied to the channel controlling unit and the disk controlling unit, etc. at the time of a power failure. By the memory power supply path 311, the DC power is supplied to the cache memory and the shared memory at the time of the power failure. Also, by the battery box controlling bus 312, operations of the switch 305 at the power failure are controlled in accordance with instructions from the microprocessors etc. of the channel controlling unit and the disk controlling unit.

The system READY lamp 306 is controlled by the charging circuit 302, and indicates, for example, that the battery box 300 is working normally when the lamp is lit and that the battery box 300 is at fault when the lamp is not lit.

Also, the battery charge lamp 307 is controlled by the charging circuit 302, and indicates, for example, that the charging of the nickel hydrogen battery 301 in the battery box 300 is completed when the lamp is lit and that the charging of the nickel hydrogen battery 301 in the battery box 300 is now being made when the lamp is not lit.

The system READY lamp 306 and the battery charge lamp 307 are disposed on the front surface of the battery box 300 so that, by checking the system READY lamp 306 and the battery charge lamp 307, it is possible for a maintenance worker(s) of the disk array device to easily check the conditions of the battery box 300.

In an ordinary case where the AC power source is supplied, the DC power from the ACDC power source etc. is inputted via the DC power supply path 310, and the nickel hydrogen battery 301 is charged by the charging circuit 302. Voltage fluctuation etc. of the nickel hydrogen battery 301 are monitored by the battery monitoring circuit 303, whereby the charging conditions of the nickel hydrogen battery 301 are controlled so that it can be optimized.

In the case of a power failure etc. of the AC power source, the DC power of the nickel hydrogen battery 301 is supplied, via the reverse flow preventing diode 304, to the DC power supply path 310 and the memory power supply path 311, whereby a backup process at the time of a power failure is carried out.

In FIG. 9, a capacitor box 320 comprises a nickel hydrogen battery 301, a charging circuit 302, a battery monitoring circuit 303, a reverse flow preventing diode 304, a switch 305, a system READY lamp 306, a battery charge lamp 307, and a capacitor 321, and has a structure in which the capacitor 321 is added for supplying, to the battery box 300 shown in FIG. 8, the DC power at the time of an instantaneous power failure.

In the capacitor box 320, in an ordinary case where the AC power source is supplied, the DC power from the ACDC power source etc. is inputted via the DC power supply path 310, and the nickel hydrogen battery 301 and the capacitor 321 are charged by the charging circuit 302. The voltage fluctuation etc. of the nickel hydrogen battery 301 are monitored by the battery monitoring circuit 303, whereby the charging conditions of the nickel hydrogen battery 301 are controlled so that it can be optimized.

In the case of a power failure etc. of the AC power source, the DC power of the capacitor 321 is supplied, via the reverse flow preventing diode 304, to the DC power supply path 310 and the memory power supply path 311 by the capacitor 321 during a period of an instantaneous power failure (e.g., 30 ms). As for a DC power source in the case of the power failure for a short time of approximately 30 ms such as an instantaneous power failure, it is possible to easily supply a large amount of DC power by using the capacitor 321.

In the case where the power failure continues even after the instantaneous power failure, similarly to the battery box 300, the DC power of the nickel hydrogen battery 301 is supplied, via the reverse flow preventing diode 304, to the DC power supply path 310 and the memory power supply path 311, whereby a backup process at the time of the power failure is carried out.

<External Structures of Battery Box and Capacitor Box>

Figure 10:
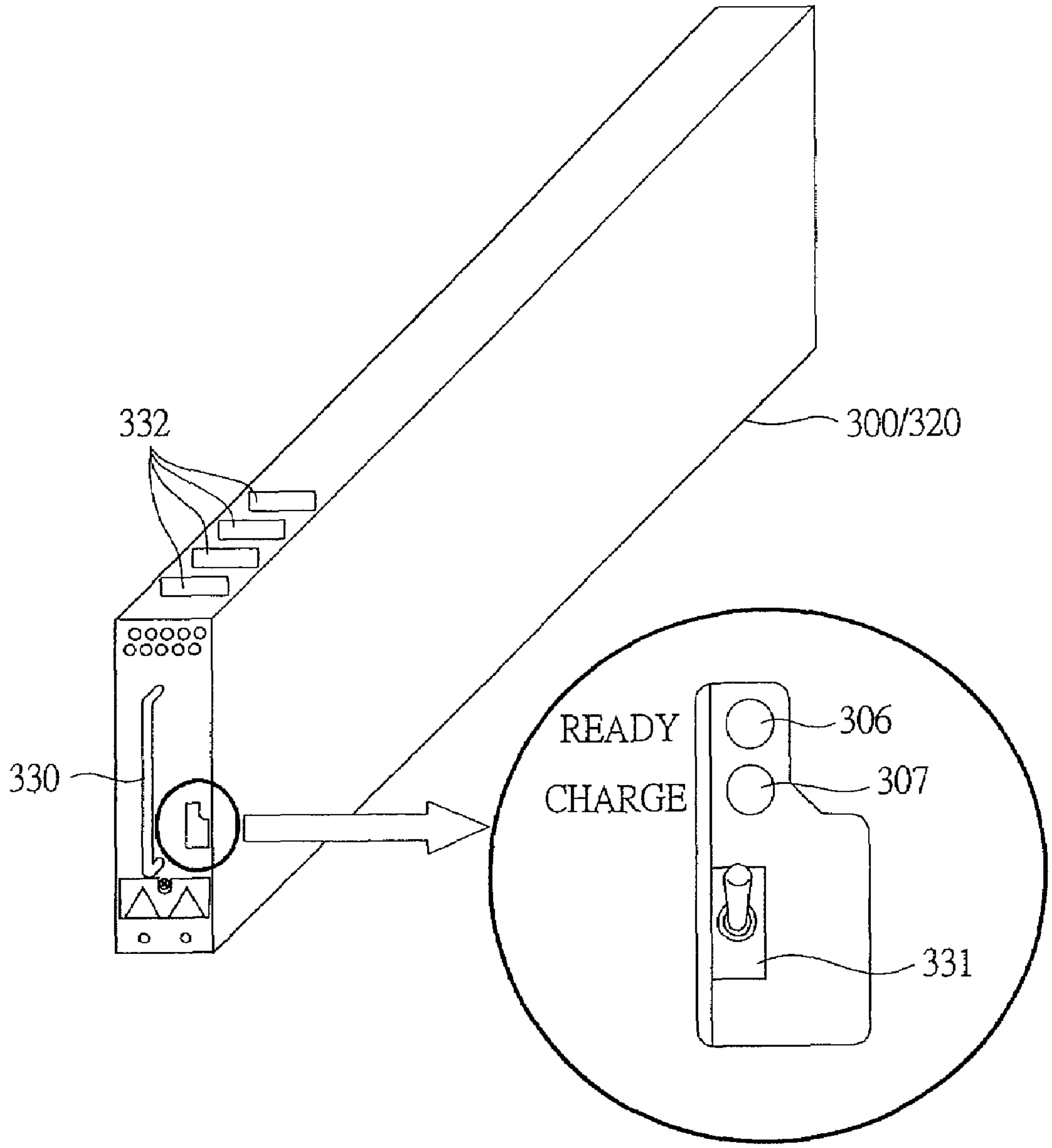
FIG. 10 is a schematic diagram showing an example of each external structure of a battery box and a capacitor box in a disk array device according to an embodiment of the present invention.

In reference to FIG. 10, an example of each external structure of a battery box/capacitor box in a disk array device according to an embodiment of the present invention will be explained below. FIG. 10 is a diagram showing an example of each external structure of the battery box and the capacitor box in the disk array device according to the embodiment of the present invention.

In FIG. 10, each of the battery box 300 and the capacitor box 320 is rectangular and is formed so that it can be mounted on the lower portion of the case body of the disk array device.

Also, on each front surface of the battery box 300 and the capacitor box 320, a handle 330, a system READY lamp 306, a battery charge lamp 307 and a switch 331 are provided. By using the handle 330, the battery box 300 and the capacitor box 320 may be easily attached and detached. By the system READY lamp 306 and the battery charge lamp 307, the conditions of the battery box 300 and the capacitor box 320 and the charging conditions of the nickel hydrogen battery 301 and the like may be easily checked by a maintenance worker(s) etc. The switch 331 is a power switch for both of the battery box 300 and the capacitor box 320.

Further, on upper surfaces and lower surfaces of the battery box 300 and the capacitor box 320, slits 332 as shown in FIG. 10 are provided. Therefore, the cooling operations inside the battery box 300 and the capacitor box 320 may be carried out using not the fans 170 etc. but natural conviction by the wind paths as shown in FIGS. 5 to 7.

<Internal Structures of Battery Box and Capacitor Box>

Figure 11:
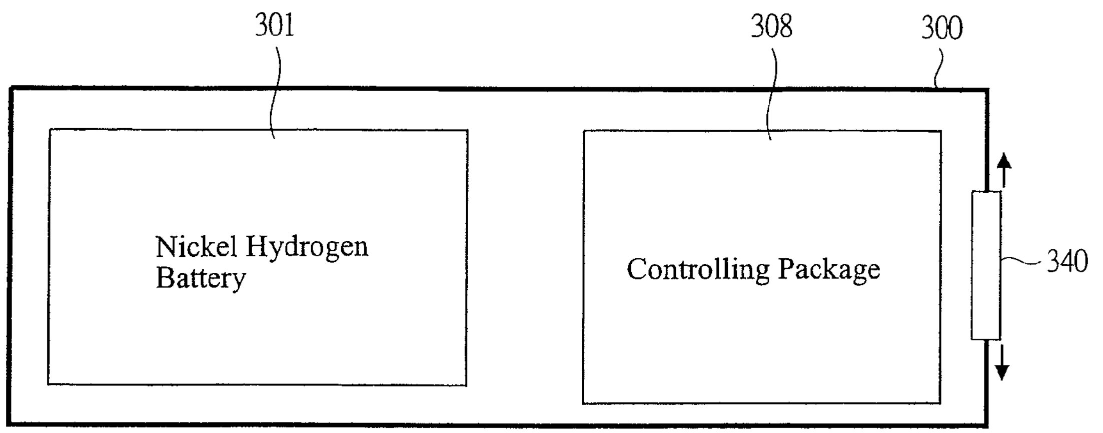
FIG. 11 is a schematic diagram showing an example of an internal structure of a battery box in a disk array device according to an embodiment of the present invention.
Figure 12:
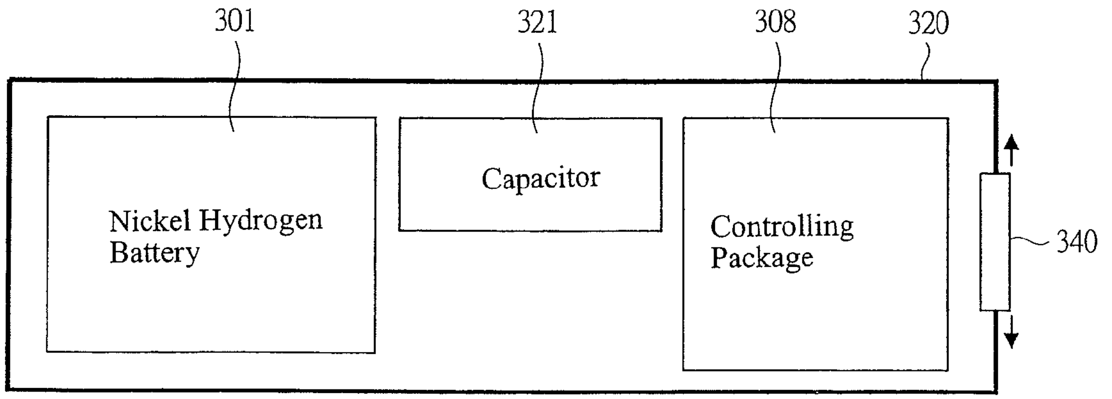
FIG. 12 is a schematic diagram showing an example of an internal structure of a capacitor box in a disk array device according to an embodiment of the present invention.
Figure 13A:
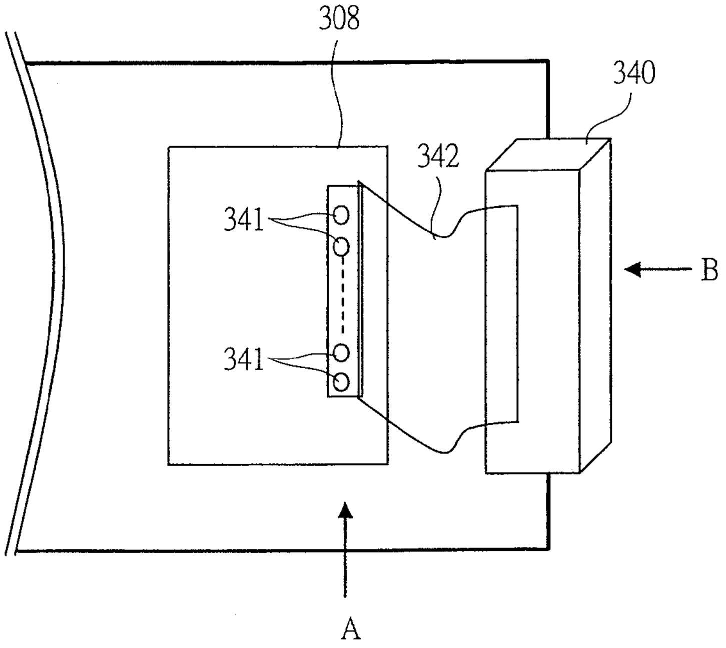
FIG. 13A is an explanatory diagram for explaining a connecting condition of a battery output connector in a disk array device according to an embodiment of the present invention.
Figure 13B:
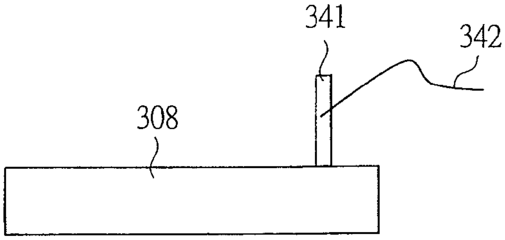
FIG. 13B is an explanatory diagram for explaining a connecting condition of a battery output connector in a disk array device according to an embodiment of the present invention.
Figure 13C:
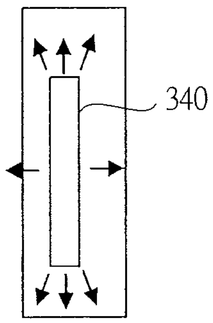
FIG. 13C is an explanatory diagram for explaining a connecting condition of a battery output connector in a disk array device according to an embodiment of the present invention.

In reference to FIGS. 11 to 13, an example of each internal structure of the battery box and the capacitor box in the disk array device according to an embodiment of the present invention will be explained below. FIG. 11 is a diagram showing an example of an internal structure of the battery box in the disk array device according to an embodiment of the present invention; FIG. 12 is a diagram showing an example of an internal structure of the capacitor box in the disk array device according to an embodiment of the present invention; and FIGS. 13A to 13C are explanatory diagrams for explaining a connecting condition of a battery output connector, wherein FIG. 13A is a view showing the neighborhood of a connection of the battery connector and FIG. 13B is a diagram viewed from the direction A in FIG. 13A and FIG. 13C is a diagram viewed from the direction B in FIG. 13A.

In the battery box 300, as shown in FIG. 11, a nickel hydrogen battery 301 is disposed in a front direction of the battery box 300 and, in the rear direction thereof, there is disposed a board of a controlling package 308 comprising a charging circuit 302, a battery monitoring circuit 303, a reverse flow prevention diode 304, and a switch 305, etc.

Also, in the capacitor box 320, as shown in FIG. 12, the nickel hydrogen battery 301 is disposed in a front direction of the capacitor box 320 and, in the rear direction thereof, there is disposed a board of a controlling package 308 comprising a charging circuit 302, a battery monitoring circuit 303, a reverse flow prevention diode 304, and a switch 305, etc., wherein a capacitor 321 is disposed between the nickel hydrogen battery 301 and the board of the controlling package 308.

As shown in FIGS. 11 and 12, by disposing the nickel hydrogen batteries 301 in the front directions of the battery box 300 and the capacitor box 320, the weighty nickel hydrogen batteries 301 can be disposed on sides of the handles 330 before them, whereby the battery box 300 and the capacitor box 320 can be easily attached and detached.

Further, each of the battery box 300 and the capacitor box 320 can be reduced in size and weight by using the nickel hydrogen battery 301. Therefore, mounting of the boxes onto the case body of the storage controlling unit 100 and the case body of the storage driving unit 200 is made not by a cable connection but by a board feed's connection in which a battery output connector 340 provided on each rear surface of the battery box 300 and the capacitor box 320 and a connector of a battery platter provided on each mounting portion of the battery box 300 and the capacitor box 320 are connected to each other.

Carrying out the board feed makes it possible to prevent voltage decline from occurring at the time of the cable connection, whereby the stable backup power source can be carried out.

Further, the battery output connector 340 is made to be a floating connector, so that it can be moved in 360 degrees, for example, to approximately 5 mm. Therefore, it is possible to improve fitting precision at the time of connecting with a connector disposed on the battery platter side and to carry out the stable connection.

The battery output connector 340 is, for example as shown in FIGS. 13A and 13B, connected via cables 342 to pins 341 provided on the board of the controlling package 308. By the cables 342 soldered to the pins 341, the battery output connector 340 can be moved in 360 degrees, as shown in FIG. 13C, and absorb pressure caused at the time of inserting the battery box 300 and the capacitor box 320. Accordingly, it is possible to improve the fitting precision at the time of connecting with the connector disposed on the battery platter side.

<Wiring around Battery Box and Capacitor Box>

Figure 14:
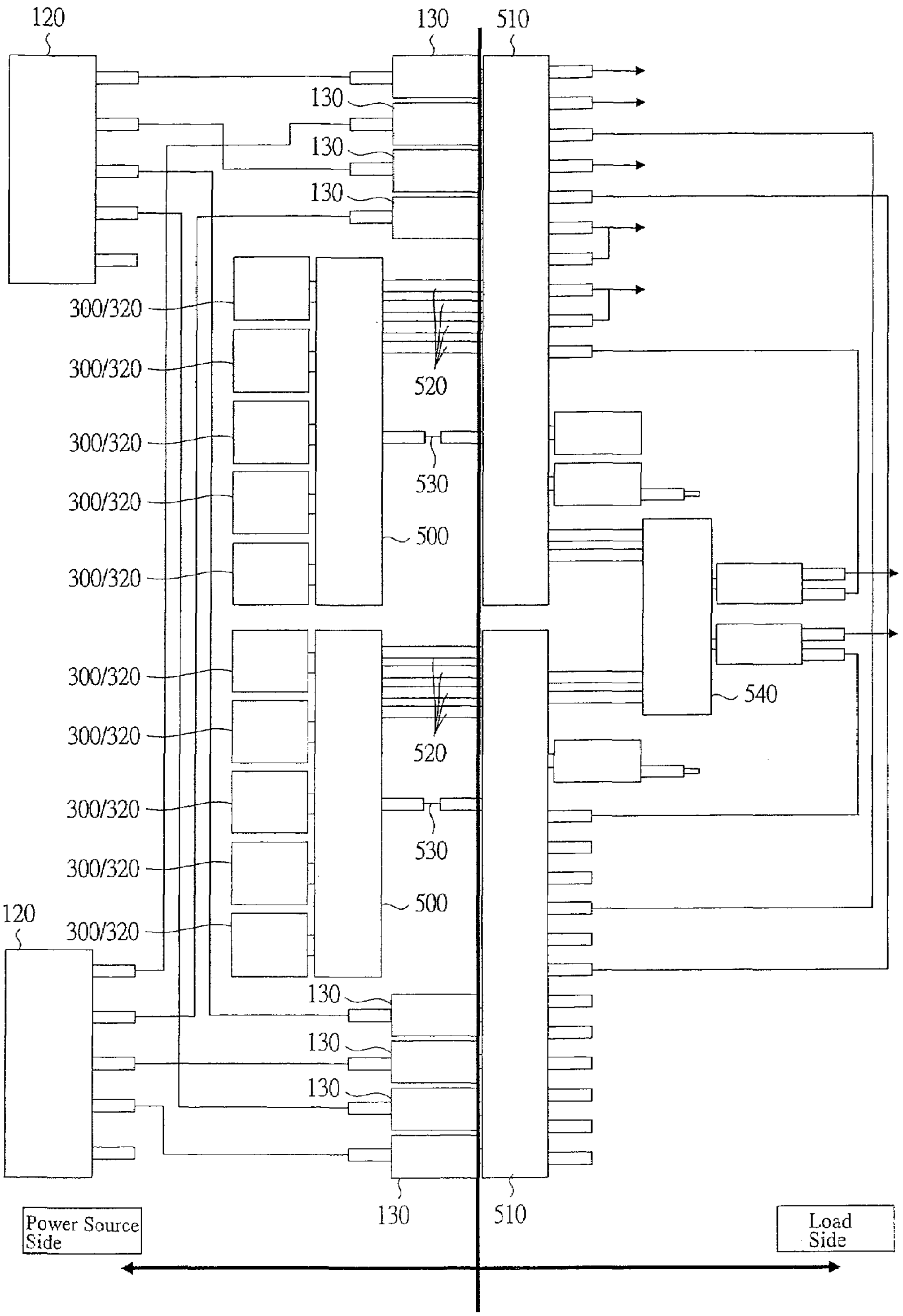
FIG. 14 is a wiring diagram showing each wiring condition around a battery box and a capacitor box of a storage controlling unit in a disk array device according to an embodiment of the present invention.
Figure 15:
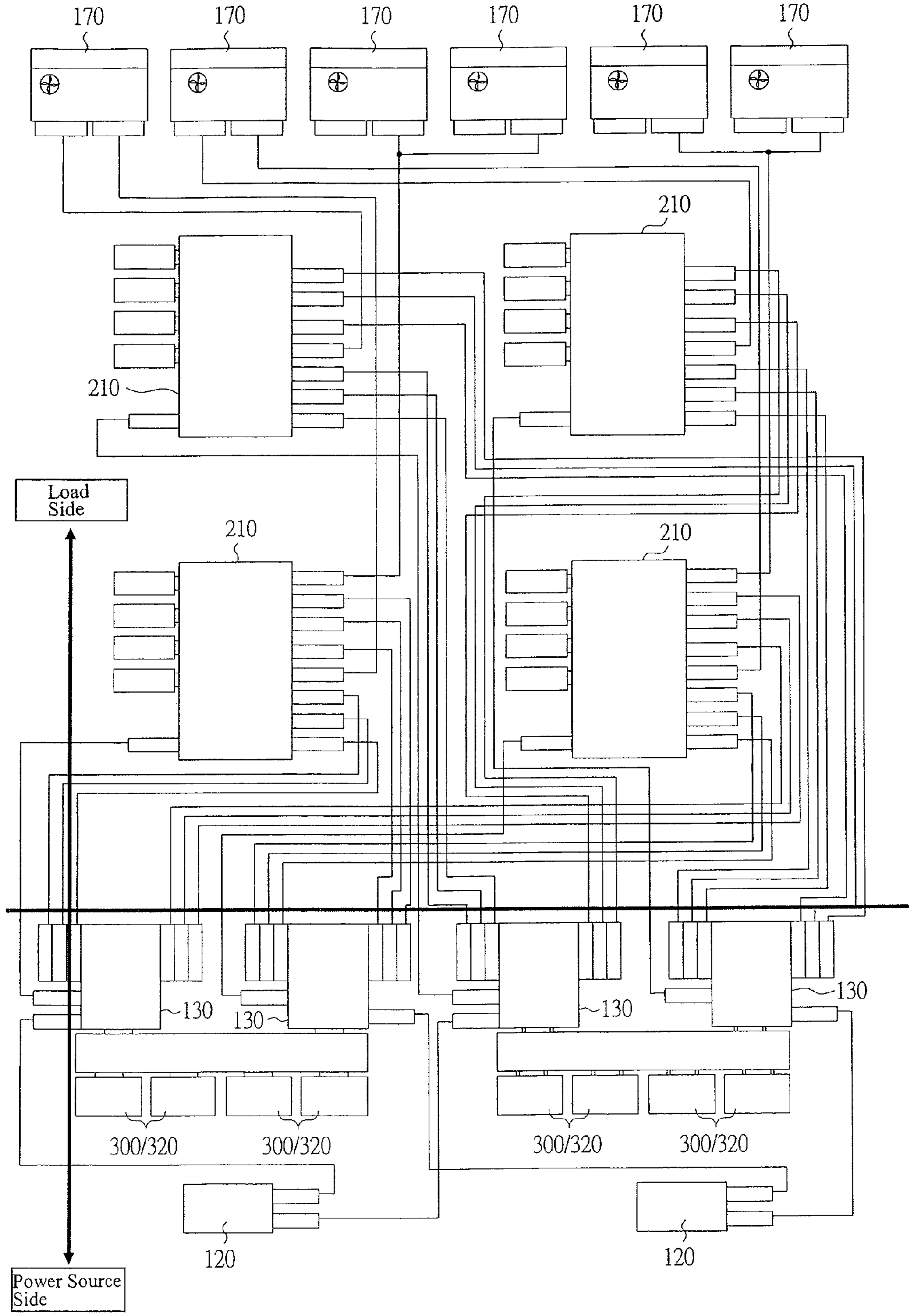
FIG. 15 is a wiring diagram showing each wiring condition around a battery box and a capacitor box of a storage driving unit in a disk array device according to an embodiment of the present invention.

In reference to FIGS. 14 and 15, wirings around the battery box and the capacitor box in the storage controlling unit of the disk array device according to an embodiment of the present invention will be explained below. FIG. 14 is a wiring diagram showing wirings around the battery box and the capacitor box in the storage controlling unit of the disk array device according to the embodiment of the present invention; and FIG. 15 is a wiring diagram showing wirings around the battery box and the capacitor box in the storage driving unit of the disk array device according to the embodiment of the present invention.

In the storage controlling unit 100, as shown in FIG. 14, the battery box 300 or capacitor box 320 is connected by battery platters 500, and each battery platter 500 is connected to a power source platter 510 that distributes a DC power source to each load.

To each power source platter 510, an ACDC power source 130 to which AC power is supplied from the AC power source 120 is connected, whereby the DC power is supplied at an ordinary time and power for charging the battery box 300 or capacitor box 320 is supplied.

Further, the battery platter 500 and the power source platter 510 are connected by metallic bus bars 520, and also signal lines 530 for sending and receiving control signals etc. to and from the battery box 300 or the capacitor box 320 are connected thereto.

The metallic bus bars 520 and the signal lines 530 are mutually disposed so as not to affect signals in the signal lines 530.

Additionally, a logic platter 540 to which a logic boards such as a channel controlling unit, a disk controlling unit, a cache memory, a shared memory, and a switch are connected in the logic box 110; the console PC 140; the service processor 150; the hard disk box 210; the fans 170; and the like are connected on the load side from the power source platter 510, whereby the DC power is supplied to each load.

In the storage driving unit 200, as shown in FIG. 15, the battery box 300 or capacitor box 320 is connected by the battery platter 500. The ACDC power source 130 to which AC power is supplied from the AC power source 120 is connected to the battery platter 500, whereby the DC power is supplied at an ordinary time and the power for charging the battery box 300 or capacitor box 320 is supplied.

Also, to the hard disk boxes 210 and the fans 170 on the load side that is connected to the ACDC power source 130, the DC power is supplied from the ACDC power source 130 at an ordinary time or the DC power from the battery box 300 or capacitor box 320 is supplied via the ACDC power source 130 at the time of a power failure.

As mentioned above, the battery box 300 and the capacitor box 320 are connected via the battery platter 500 by the board feed. Therefore, it is possible to prevent voltage decline from occurring at the time of the cable connection and to supply the stable backup power source.

<Backup Controlling Operation at Power Failure>

Figure 16:
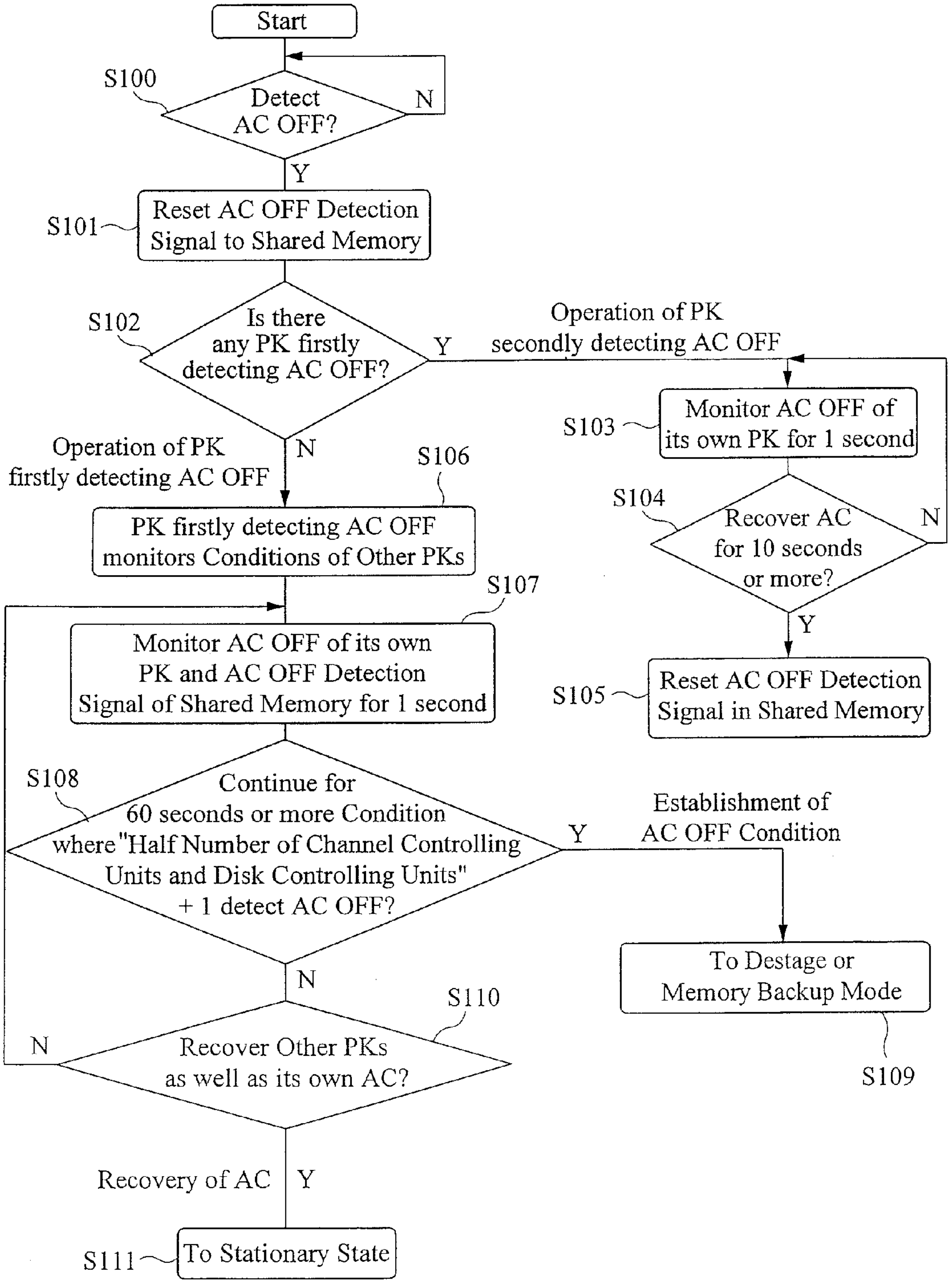
FIG. 16 is a flowchart showing a backup controlling operation at the time of a power failure in a disk array device according to an embodiment of the present invention.
Figure 17:
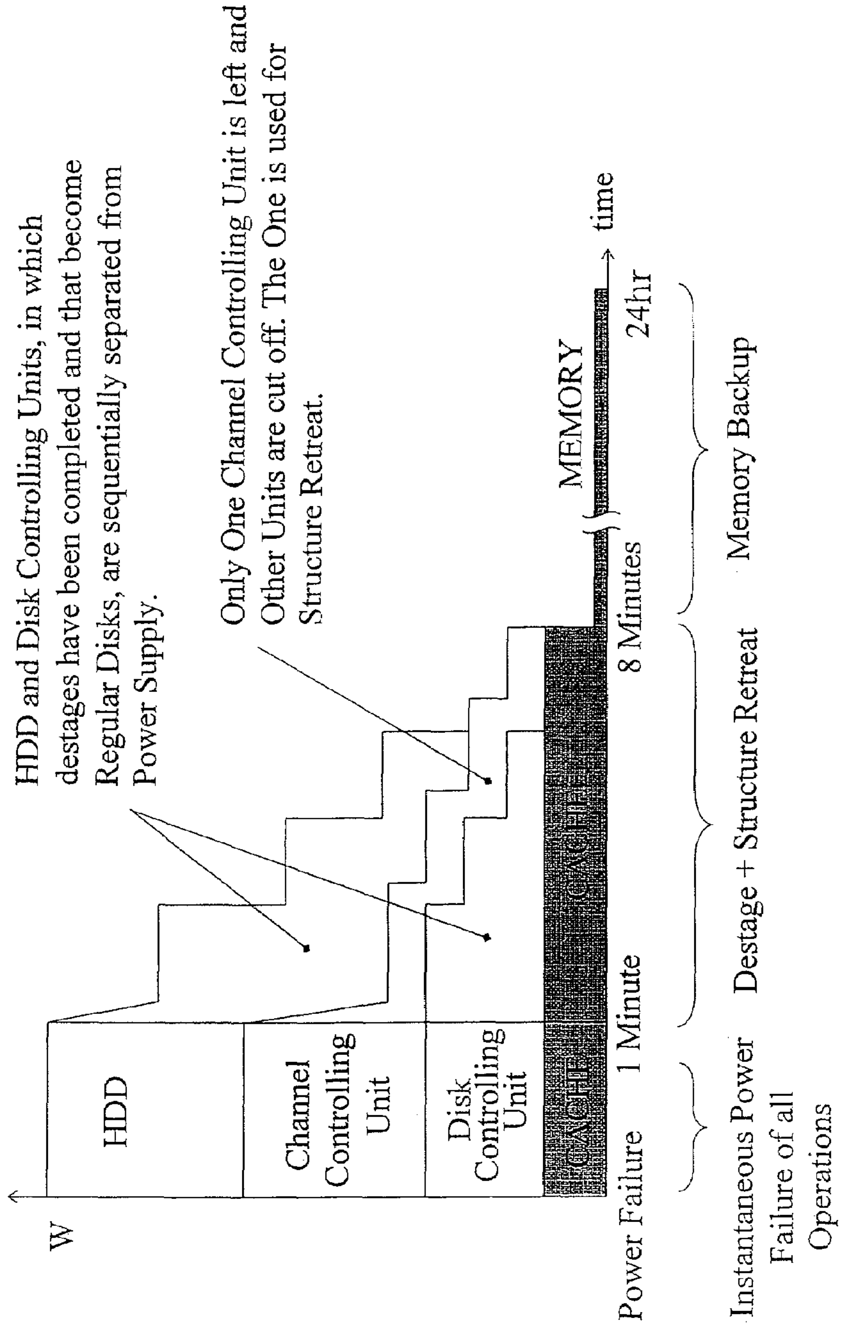
FIG. 17 is a diagram showing a relation between backup time and electric power when a destage operation is performed at the time of a power failure in a disk array device according to an embodiment of the present invention.
Figure 18:
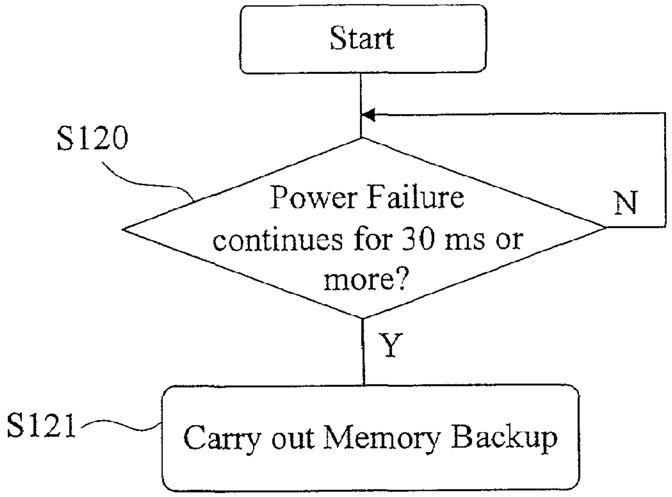
FIG. 18 is a flowchart showing a backup controlling operation at the time of a power failure in a disk array device according to an embodiment of the present invention.
Figure 19:
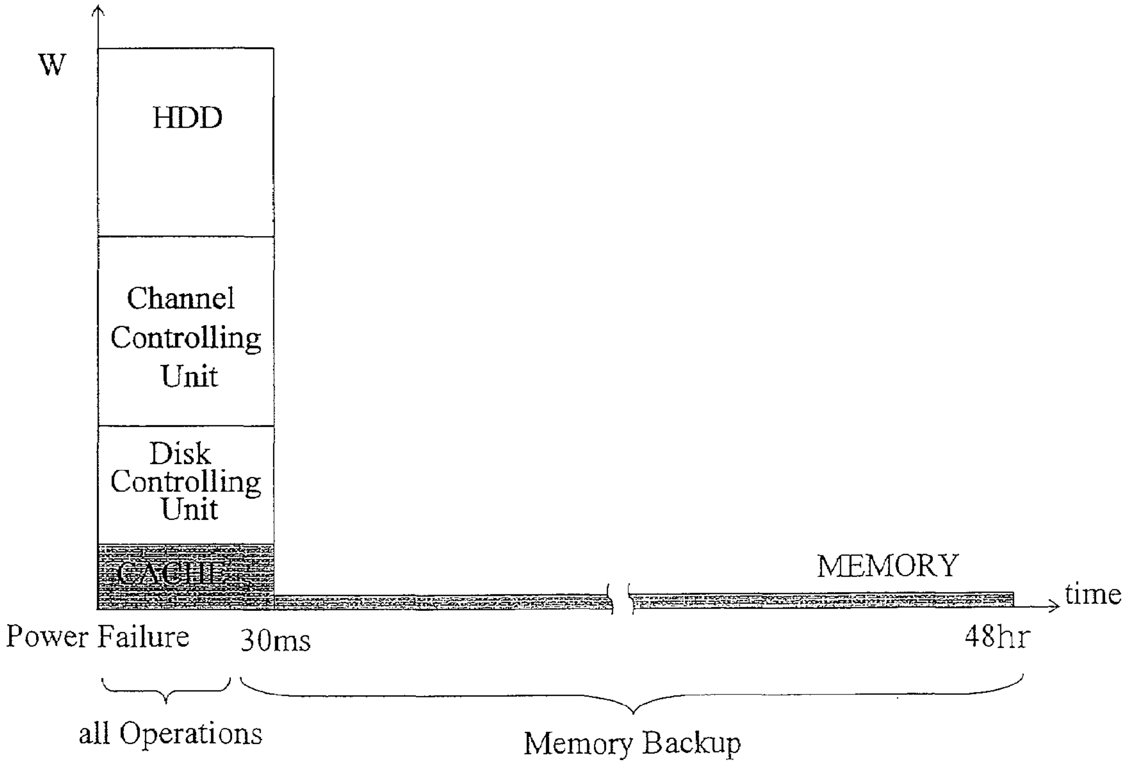
FIG. 19 is a diagram showing a relation between backup time and electric power when a memory backup operation is performed without performing a destage operation at the time of a power failure in a disk array device according to an embodiment of the present invention.

In reference to FIGS. 16 to 19, a backup controlling operation at the time of a power failure of the disk array device according to the embodiment of the present invention will be explained below. FIG. 16 is a flowchart showing the backup controlling operation at the time of a power failure of the disk array device according to the embodiment of the present invention, and shows the case of performing a destage operation at the time of a power failure. FIG. 17 is a diagram showing the relation between backup time and electric power when a destage operation is performed at the time of a power failure. FIG. 18 is a flowchart showing a backup controlling operation at the time of a power failure of a disk array device according to the embodiment of the present invention, and shows the case of performing not a destage operation but a memory backup operation at the time of a power failure. FIG. 19 is a diagram showing the relation between backup time and electric power in the case of performing not a memory backup operation but a destage operation at the time of a power failure.

Detection of "AC OFF" owing to a power failure is made by the channel controlling unit and the disk controlling unit in the logic box 110, and detection of a power failure is made by the respective packages (PK) of the channel controlling unit and the disk controlling unit.

In the case of performing the destage operation at the time of a power failure, as shown in FIG. 16, whether AC OFF has been detected is determined (S100). If AC OFF is detected in S100, an AC OFF detection signal is set to the shared memory in the logic box 110 (S101). By doing so, information of the AC OFF detection by the respective packages of other channel controlling unit and disk controlling unit is shared.

Then, by confirming the information in the shared memory, whether the packages of the channel controlling unit and the disk controlling unit having firstly detected the AC OFF exist is determined (S102).

When it is determined that the packages of the channel controlling unit and the disk controlling unit having firstly detected the AC OFF exist in S102, the packages secondly detecting the AC OFF are operated. The self-package AC OFF is monitored for one second (S103), and it is determined whether AC has been recovered for 10 seconds or more (S104). If it is determined that the AC has not been recovered for 10 seconds or more in S104, the procedure goes back to S103. If it is determined that the AC has been recovered for 10 seconds or more in S104, the AC OFF detection signal that is set in the shared memory is reset (S105).

Also, if it is determined that the packages of the channel controlling unit and the disk controlling unit having firstly detected the AC OFF in S102 do not exist, the packages having firstly detected the AC OFF are operated. The packages having firstly detected the AC OFF monitors the conditions of other packages (S106).

Then, the self-package AC OFF and the AC OFF detection signal of the shared memory are monitored for one second (S107). It is determined whether the condition where "half number of channel controlling units and disk controlling units" +1 (e.g., 5 packages if the channel controlling units and the disk controlling units have 8 packages) have detected the AC OFF continues for 60 seconds or more (S108).

If it is determined in S108 that the condition where the "half number of channel controlling units and disk controlling units" +1 have detected the AC OFF continues for 60 seconds or more, the AC OFF condition is established and the destage or a backup processes such as memory backup is carried out (S109).

Meanwhile, if it is determined in S108 that the condition where the half number of channel controlling units and disk controlling units +1 have detected the AC OFF does not continue for 60 seconds or more, whether its own AC has been recovered and whether other packages also have been recovered are determined (S110). If its own AC has been recovered and other packages have not been recovered in S110, the procedure goes back to S107. If its own AC has been recovered and other packages have also been recovered in S110, it is assumed that the AC has been recovered, whereby the procedure goes to a stationary state (S111).

Also, with respect to the relation between backup time and power at the time when the AC OFF condition is established and a power failure condition gets in is started, as shown in FIG. 17, a first one minute is a period for establishing the AC OFF condition. During this period, all of the hard disks, channel controlling units, disk controlling units, and cache memory/shared memory are operated.

After a lapse of one minute, when the AC OFF condition is established, the destage and the structure retreat are carried out. Thereby, the hard disks and the disk controlling units, in which the respective destages have been completed and which become regular disks, are sequentially separated from the power supply, and only one channel controlling unit is left and the other channel controlling units are cut off. The one channel controlling unit is used for structure retreat. Then, when the destage operation is completed, only memory backup of the cache memory and the shared memory is carried out for data guarantee, speeding up at the time of next startup, and memory residence.

Further, when not a destage operation but a memory backup operation is carried out at the time of a power failure, as shown in FIG. 18, it is determined whether a power failure has continued for 30 ms or more (S120). If it is determined that the power failure has not continued for 30 ms or more in S120, the procedure goes back to S120. If it is determined that the power failure has continued for 30 ms or more in S120, the memory backup is carried out as not the instantaneous power failure but the power failure (S121).

Further, the relation between backup time and power in the case of a power failure condition caused due to a power failure longer than an instantaneous power failure is shown in FIG. 19, wherein during a period of 30 ms for determining an instantaneous power failure, all of the hard disks, channel controlling units, disk controlling units, and cache memory/shared memory are operated.

At the time of becoming a power failure condition owing to a power failure continuing for 30 ms or more, hard disks and respective packages except the cache memory and the shared memory are cut off and only the memory backup is carried out.

Even in the case of carrying out a destage operation, if hard disks etc. at a destage destination are not guaranteed or if the destage operation cannot be carried out because a trouble occurs during an instantaneous power failure, the hard disks and the respective packages except the cache memory and the shared memory are cut off and only the memory backup is carried out after a lapse of 30 ms that requires being recognized as an instantaneous power failure or a lapse of one minute that requires establishing the AC OFF condition.

As mentioned above, in this embodiment, a nickel hydrogen battery 301 is used as a battery utilized for backup at the time of a power failure, thereby becoming compact size and having large capacity. Therefore, the battery having such capacity as to able to carry out the destage process at the time of the power failure can be mount on each lower portion of the case bodies of the storage controlling unit 100 and the storage driving unit 200, whereby it is possible to realize efficient utilization from the viewpoint of securing an installation place for the disk array device etc.

Further, the cooling of the battery boxes 300 and the capacitor boxes 320 are performed by the fact that the fans 170 for cooling are not provided on the battery boxes 300 and the capacitor boxes 320 incorporating the nickel hydrogen batteries 301 and that there are used natural conviction created by the wind paths in the case bodies due to the fans 170 for cooling the respective portions of the storage controlling unit 100 and the storage driving unit 200. Therefore, it is possible to carry out the cooling operation at a temperature range of 15° C. to 25° C., which is optimum as an operation temperature of each nickel hydrogen battery 301 in the battery boxes 300 and the capacitor boxes 320, and to expand the life of the nickel hydrogen batteries to maximum, and to secure a guarantee period of each battery disposed in the disk array device.

Still further, since the capacitor boxes 320 are used, the capacitors 321 in the capacitor boxes 320 can supply DC power in the case of a power failure for a short time of approximately 30 ms such as an instantaneous power failure and the like, whereby a stable large amount of DC power can be supplied at the time of an instantaneous power failure.

Moreover, since the battery box 300 and the capacitor box 320 are connected by use of the battery platter 500 and by the board feed, voltage drop can be restrained and the stable backup power source can be supplied.

As described above, the invention made by the inventors has been concretely based on the embodiments. However, needless to say, the present invention is not limited to the above-mentioned embodiments and can be variously modified and altered without departing from the gist thereof.

Effects obtained by the representative ones of the inventions disclosed by this application will be briefly described as follows.

According to the present invention, by the batteries mounted in the case bodies of the disk array device, it is possible to carry out a battery backup operation including a destage process of data and further to increase instantaneous power failure durability to an instantaneous power failure.

What is claimed is:

1. A disk array device connected to a higher-level device, comprising:

a memory device mounting unit which mounts a plurality of memory devices;

a logic mounting unit which is connected to said memory device mounting unit and receives a read request and/or write request from said high-level device to control data read and/or write from/to any one of said plurality of memory devices; and a battery mounting unit which mounts a battery, stores a part of electric power supplied to said logic mounting unit and said memory device mounting unit, and supplies said stored electric power to said logic mounting unit and said memory device mounting unit at the time of a power failure, wherein:

said logic mounting unit mounts a cache memory which temporarily stores data transferred from said high-level device and performs control to write the data stored in said cache memory to said plurality of memory devices at the time of power failure, the power supply from said battery mounting unit to said plurality of memory devices is sequentially stopped in an order of memory device to which data writing from said cache memory has been completed, and even after the power supply to the hard disks in which the destage has been completed is stopped, the power supply into the cache memory from the battery is continued.

2. A disk array device according to claim 1, comprising:

a fan for cooling each of said logic mounting unit and said memory device mounting unit; and a case body accommodating each of said logic mounting unit and said memory device mounting unit, wherein said logic mounting unit mounts: a channel controlling unit to which the higher-level device is connected and that performs data transfer control; a disk controlling unit to which a memory device is connected and that performs data transfer control; a shared memory into which control information communicated by said channel controlling unit and said disk controlling unit is stored; and a connecting unit to which said channel controlling unit, said disk controlling unit, said cache memory, and said shared memory are connected, said battery mounting unit is disposed at a lower portion of said case body, and includes a nickel hydrogen battery disposed at the lower portion of said case body, which is cooled by natural convection of air inside said case body by said fan.

3. A disk array device according to claim 2, wherein said battery mounting unit carries out connection in said case body, by a board feed connection using a connector.

4. A disk array device according to claim 2, wherein said battery mounting unit mounts a capacitor that supplies a backup power source at the time of an instantaneous power failure.

5. A disk array device according to claim 2, wherein said battery mounting unit has a slit for making air come through an inside of said battery mounting unit.

6. A disk array device according to claim 2, wherein said battery mounting unit has, on a front surface thereof, a display unit indicating a condition of said battery mounting unit and a charge condition of said nickel hydrogen battery.

7. A disk array device according to claim 1, comprising:

a storage controlling unit with said logic mounting unit;

a storage driving unit with said memory device mounting unit;

a fan for cooling each of said logic mounting unit and said memory device mounting unit; and a first case body for accommodating said storage controlling unit and a second case body accommodating said storage driving unit, wherein said logic mounting unit mounts: a channel controlling unit to which the higher-level device is connected and that performs data transfer control; a disk controlling unit to which a memory device is connected and that performs data transfer control; a shared memory into which control information communicated by said channel controlling unit and said disk controlling unit is stored; and a connecting unit to which said channel controlling unit, said disk controlling unit, said cache memory, and said shared memory are connected, said battery mounting unit is disposed at each lower portion of the case body of said storage controlling unit and the case body of said storage driving unit, and includes a nickel hydrogen battery which is disposed at each lower portion of the first case body of said storage controlling unit and the second case body of said storage driving unit, and is cooled by natural convection of air created inside the first case body of said storage controlling unit and the second case body of said storage driving unit by said fan.

8. A disk array device according to claim 7, wherein said battery mounting unit carries out connection in the first case body of said storage controlling unit and the second case body of said storage driving unit, by a board feed connection using a connector.

9. A disk array device according to claim 7, wherein said battery mounting unit mounts a capacitor for supplying a backup power source at a time of an instantaneous power failure.

10. A disk array device according to claim 7, wherein said battery mounting unit has a slit for making air come through an inside of said battery mounting unit.

11. A disk array device according to claim 7, wherein said battery mounting unit has a display unit for indicating each of a condition of said battery mounting unit and a charge condition of said nickel hydrogen battery, on a front surface thereof.

12. A disk array device according to claim 1, wherein said battery is a nickel hydrogen battery.

* * * * *